United States Patent
Lloyd et al.

(10) Patent No.: US 11,188,727 B1
(45) Date of Patent: Nov. 30, 2021

(54) EFFICIENT PARALLEL BARCODE SUBPIXEL ALIGNMENT

(71) Applicant: Amazon Technologies, Inc., Seattle, WA (US)

(72) Inventors: Taylor Jeffrey Lloyd, Seattle, WA (US); Keith Deacon, Monroe, WA (US); Dylan Andrew Norris, Redmond, WA (US); Alton Paul Werronen, Auburn, WA (US); Animesh Mishra, Cambridge (GB); Roman Shmulevich, Woodbridge (CA)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 16/696,156

(22) Filed: Nov. 26, 2019

(51) Int. Cl.
*G06K 7/10* (2006.01)
*G06K 7/14* (2006.01)
*G06K 7/015* (2006.01)

(52) U.S. Cl.
CPC ........... *G06K 7/1456* (2013.01); *G06K 7/015* (2013.01); *G06K 7/1413* (2013.01); *G06K 7/1443* (2013.01); *G06K 7/1447* (2013.01); *G06K 7/1452* (2013.01); *G06K 7/1469* (2013.01)

(58) Field of Classification Search
CPC .... G06K 7/1456; G06K 7/015; G06K 7/1413; G06K 7/1443; G06K 7/1447; G06K 7/1452; G06K 7/1469
USPC .............. 235/462.08, 462.41, 437
See application file for complete search history.

(56) References Cited

U.S. PATENT DOCUMENTS

| | | | | |
|---|---|---|---|---|
| 5,525,788 A * | 6/1996 | Bridgelall | .......... | G06K 7/10564 235/462.08 |
| 2014/0021258 A1* | 1/2014 | Olmstead | ........... | G06K 7/10544 235/462.41 |
| 2016/0140374 A1* | 5/2016 | Ye | ........................ | G06K 7/1417 235/437 |

* cited by examiner

*Primary Examiner* — Thien M Le
(74) *Attorney, Agent, or Firm* — Patterson + Sheridan, LLP

(57) ABSTRACT

A camera-based barcode reader captures an image, determines a region of interest of a barcode within the image, and generates a barcode image from the region of interest. The camera-based barcode reader aligns each of multiple horizontal regions within the barcode image to a reference horizontal region within the barcode image. The alignment of a horizontal region includes (i) determining a set of alignment parameters to apply to the horizontal region based on a comparison of the reference horizontal region to the horizontal region when adjusted to different combinations of alignment parameters and (ii) adjusting the horizontal region according to the set of alignment parameters for that horizontal region. After aligning the barcode image, the camera-based barcode reader decodes the barcode from the barcode image.

20 Claims, 12 Drawing Sheets

EFFICIENT PARALLEL BARCODE SUBPIXEL ALIGNMENT

BACKGROUND

The present invention generally relates to techniques for reading barcodes, and more specifically, to techniques for aligning barcode images captured via camera-based barcode readers to correct tilt and skew of the barcode images.

Retailers, wholesalers, and other product distributors typically maintain an inventory of various items that may be ordered, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Facilities generally use barcodes to identify and track items through various stages of the facility. For example, a barcode is typically a set of symbols that stores identifying information about an item associated with the barcode. The barcode on a given item can be read, decoded, and processed to extract the data for a variety of applications (e.g., pricing, order fulfillment, sortation, shipping, etc.).

Modern facilities have generally transitioned away from employing laser-based barcode scanners to employing camera-based (or image-based) barcode readers to read barcodes on items. In a camera-based barcode reader system, an image of the barcode is captured and digital image processing techniques are used on the image to decode the barcode. One issue with using camera-based barcode readers is that the decoding performance is impacted by the quality of the captured image. For example, images captured by camera-based barcode readers can be difficult to process in high noise environments, low lighting conditions, barcode damage, etc. As a facility can process vast quantities of items, in many situations it is critical that any such facility that uses camera-based barcode devices to identify items be capable of operating at a very high rate of success. For example, if a facility has a high rate of mis-identifying items, such failures could significantly delay the workflow of the facility.

BRIEF DESCRIPTION OF DRAWINGS

Various embodiments in accordance with the present disclosure will be described with reference to the drawings, where like designations denote like elements.

DETAILED DESCRIPTION

Figure 1:
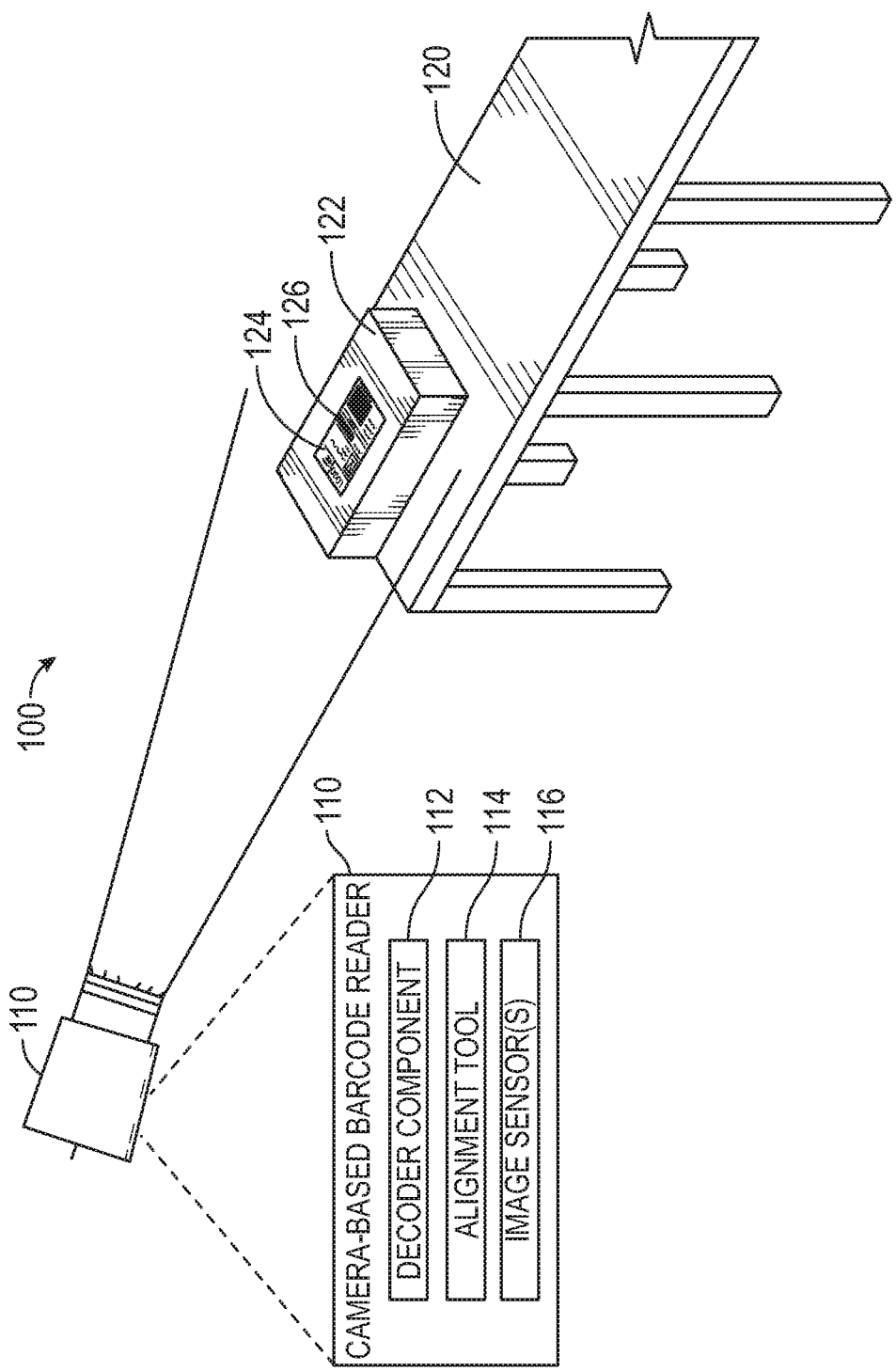
FIG. 1 illustrates an example environment configured with a camera-based barcode reader, according to one embodiment.

A facility (e.g., shipping warehouse, fulfillment center, etc.) can use a computer vision system to process data received from camera-based (or image-based) barcode readers (or scanners) in the facility. For example, the computer vision system can use the camera-based barcode readers to detect and read barcodes (e.g., linear barcodes or one dimensional (1D) barcodes) on various items (or packages) in the facility. When locating linear barcodes in a two dimensional (2D) image, conventional techniques generally produce a region of interest (ROI) (e.g., an estimated location and/or orientation) of the barcode within the image that is not perfectly aligned to the barcode.

In some cases, the misalignment of a ROI could be due to linear distortions and/or non-linear distortions. Linear distortions, for example, can occur when there is an incorrect localization of the ROI with respect to the barcode, when the image is captured with a rolling shutter at constant speed, etc. Non-linear distortions can occur in scenarios where there is curved barcode surface, the image is captured with a rolling shutter at variable speed, etc. Additionally, in some cases, the misalignment of a ROI could be due to the quality of the captured image (e.g., the image may have been captured in low lighting conditions, the image may be a low resolution image, etc.). Further still, in some cases, the misalignment could be due to artifacts (e.g., defects) in the barcode (e.g., the barcode may be faint, faded, wrinkled, smudged, (partially) torn, etc.). As a result, when the ROI is extracted for further processing, this misalignment often leads to tilted and/or skewed bars and spaces in the barcode image, significantly impacting the performance and accuracy of the decoding process.

As such, embodiments herein provide techniques for correcting misalignments in barcodes extracted from images captured by one or more camera-based barcode readers. As described in more detail below, a camera-based barcode reader can include an alignment tool that evaluates, using different combinations of alignment parameters, one or more pixel regions within a barcode image with respect to a reference pixel region within the barcode image, and determines a set of alignment parameters to apply to each of the one or more pixel regions, based on the evaluation. In one embodiment, the set of alignment parameters may include a set of offset adjustments (or values) (e.g., a position of the pixel region in the x direction relative to a position of the reference pixel region) and/or a set of scale adjustments (or values) (e.g., a size of the pixel region in the x direction relative to a size of the reference pixel region). The camera-based barcode reader can use the alignment tool to correct the misalignments in the extracted barcode, e.g., by adjusting the different pixel regions of the barcode using their respective alignment parameters. In one embodiment, for example, the alignment parameters can be used to correct at least one of a tilt and skew of the barcode image. Once aligned, the camera-based barcode reader can then decode the barcode.

In this manner, embodiments can significantly reduce misalignment and other distortions in barcode images that impact the quality and performance of the decoding process. This in turn enables facilities to significantly reduce the complexity and cost associated with setting up and maintaining a computer vision system to identify and track packages within the facility. For example, embodiments can reduce (or even eliminate) the need for camera-based barcode readers to use high resolution image sensors and high quality lens (typically associated with conventional computer vision systems) in order to capture high resolution images of barcodes on packages.

While the embodiments herein primarily discuss correcting alignment of barcode images captured by camera-based barcode readers within a facility, such as a fulfillment center, this disclosure is not limited to such environments and can be used for other applications. For example, the techniques described herein could be used in retail stores (e.g., to identify and track items for sale), in postal service locations (e.g., to identify and track mail), etc. Additionally, note that, as used herein, the "quality" of an image may refer to (or be based on) one or more image attributes, such as sharpness, noise, dynamic range, resolution, contrast, etc. A "high quality" image, for example, may include a higher sharpness, lower noise, higher dynamic range, higher resolution, etc. relative to a "low quality" image. Similarly, a "low quality" image, for example, may include a lower sharpness, higher noise, lower dynamic range, lower resolution, etc., relative to a "high quality" image. Further, note that, as used herein, a 1D barcode (also referred to as a linear barcode) refers to a two-dimensional (2D) representation of a series of vertically (aligned) lines of varying widths and spacings.

FIG. 1 depicts an example environment 100 configured with a camera-based barcode reader 110, according to one embodiment. The camera-based barcode reader 110 may be deployed in a facility or warehouse (e.g., distribution facility, fulfillment center, etc.) that is logically organized into areas or regions associated with various functions (e.g., storage, inventory, shipping, picking, sorting, etc.). In the illustrated example, the camera-based barcode reader 110 is positioned to capture one or more images of packages (e.g., package 122) in the region (or area) 120. Although the region 120 is depicted as a table in FIG. 1, the region 120 is representative of a variety of areas in the environment 100 where packages can be identified and/or retrieved. In one embodiment, the region 120 may include a conveyor belt (or a series of conveyor belts) used to transition items throughout a facility. In another embodiment, the region 120 may include a storage or staging area where packages are placed in the facility. In yet another embodiment, the region 120 may include a container or holding apparatus (e.g., pallet, pallet box, bag, bin, etc.). In general, the region 120 can include any apparatus with a form factor suitable for identifying barcodes on packages.

The camera-based barcode reader 110 is disposed in proximity to the region 120. In one embodiment, assuming the region 120 includes one or more conveyor belts, the camera-based barcode reader 110 can be placed above (or in any other suitable location) on the conveyor belt(s) in order to capture images of shipping labels on the packages on the conveyor belt(s). The camera-based barcode reader 110 may be placed sufficiently close to the region 120 to allow the camera-based barcode reader 110 to capture an image (with a resolution above a threshold resolution) of the label 124 on the package 122, while providing sufficient clearance for packages 122 placed (or arriving or transitioning through) in the region 120.

The camera-based barcode reader 110 may have a corresponding field of view of an area (or portion) of the region 120. The camera-based barcode reader 110 may be configured to automatically capture an image of the label 124 on the package 122 (e.g., in the camera-based barcode reader's field of view) once the package 122 is detected in the region 120. In some embodiments, an associate can expose the package 122 to the camera-based barcode reader 110, e.g., prior to removing the package 122 from the region 120, in order to allow the camera-based barcode reader 110 to capture an image of the label 124. Note that while FIG. 1 depicts a single camera-based barcode reader 110 in proximity to the region 120, the embodiments described herein are not limited to any particular number of camera-based barcode readers 110.

As shown, the camera-based barcode reader 110 includes a decoder component 112, an alignment tool 114, and image sensor(s) 116. The camera-based barcode reader 110 can capture an image of the label 124 with the image sensor(s) 116. The camera-based barcode reader 110 can then use the decoder component 112 to process the image, e.g., to identify and read the barcode 126. For example, the camera-based barcode reader 110 can perform a localization of the image to determine a ROI (also referred to herein as a "bounding box") that defines an estimated location and/or orientation) of the barcode 126 within the captured image. The camera-based barcode reader 110 can then extract the barcode 126 from the ROI and decode the barcode 126.

As noted, however, in some cases, the ROI determined by the camera-based barcode reader 110 from the captured image may be misaligned relative to the barcode 126. A linear barcode, e.g., has a rectangular shape, where information in the barcode is organized horizontally in bar and space widths. On the other hand, in many cases, the ROI determined from the captured image may be a quadrilateral where at least one of the sides is misaligned with a corresponding one of the sides of the barcode 126. For example, the top side of the quadrilateral may be misaligned with the top side of the barcode 126, the left side of the quadrilateral may be misaligned with the left side of the barcode 126, the right side of the quadrilateral may be misaligned with the right side of the barcode 126, the bottom side of the quadrilateral may be misaligned with the bottom side of the barcode 126, etc. In some cases, due in part to the misalignment, the ROI extracted from the image may be missing a portion of the barcode 126.

As noted, the misaligned ROI could be due in part to linear incorrect localizations and/or use of a rolling shutter to capture images. In the case of an incorrect localization, a camera-based barcode reader may have captured the image in low-lighting conditions, causing the localizer to draw a misshapen (or misaligned) quadrilateral over the barcode. Using a rolling shutter can also distort barcode images. For example, in scenarios where the rolling shutter captures an image of the barcode moving at a constant speed, the rolling shutter can create linear affine distortions (or transformations). In scenarios where the rolling shutter captures an image of the barcode moving at a high speed (e.g., on a conveyor belt), the rolling shutter can create non-linear distortions in the barcode. Non-linear distortions in the barcode can also result from artifacts present in the barcode itself (e.g., the barcode may have a curved surface, the barcode may be smudged, torn, worn, faded, etc.).

Generally, when a misaligned ROI is extracted into a rectangle for further processing (e.g., by the decoder component 112), the misalignment may cause the barcode 126 have tilted and/or skewed bars and spaces. This can lead to a significant amount of error when the decoder component 112 attempts to decode the barcode 126. Accordingly, in embodiments described herein, the camera-based barcode reader 110 includes the alignment tool 114, which can identify and correct misalignments in barcodes extracted from a given ROI in a captured image.

In one particular embodiment, upon receiving a barcode image (that has been extracted from a ROI in an image), the alignment tool 114 can identify a reference region of pixels (also referred to herein as a reference line or a reference row) within the barcode image. In one example, the reference region of pixels extends horizontally across the barcode image and is centered vertically within the barcode image. For each (target) horizontal region of pixels on a first side of the reference region (e.g., above the reference region), the alignment tool 114 can test different combinations of alignment parameters (e.g., different scale/offset combinations) on the horizontal region of pixels and determine a set of alignment parameters (e.g., scale/offset combination) to apply to the horizontal region of pixels, based on minimizing or maximizing a value function. In one embodiment, minimizing a value function may involve determining, for each combination of alignment parameters, an amount of difference between the pixel(s) in the horizontal region (adjusted with the combination of alignment parameters) and pixel(s) in the reference region, and selecting the combination of alignment parameters that results in the smallest amount of difference between the pixel(s) in the horizontal region (adjusted with the combination of alignment parameters) and pixel(s) in the reference region. Similarly, in one embodiment, maximizing a value function may involve determining, for each combination of alignment parameters, an amount of similarity between the pixel(s) in the horizontal region (adjusted with the combination of alignment parameters) and pixel(s) in the reference region, and selecting the combination of alignment parameters that results in the largest amount of similarity between the pixel(s) in the horizontal region (adjusted with the combination of alignment parameters) and pixel(s) in the reference region.

For each horizontal region, the alignment tool 114 can select the set of alignment parameters for which the comparison between the horizontal region and the reference region satisfies a predetermined condition (e.g., a value function is minimized, a value function is maximized, etc.), and use the set of alignment parameters to adjust the horizontal region (e.g., in order to align the horizontal region with the reference region). In one embodiment, once each of the horizontal regions of pixels on the first side of the reference region has been adjusted, the alignment tool 114 may perform a similar alignment process for each (target) horizontal region of pixels on a second side of the reference region (e.g., below the reference region). After aligning the barcode 126, the alignment tool 114 can send the aligned barcode 126 to the decoder component 112 for processing.

In this manner, embodiments can significantly reduce misalignment and other distortions in barcode images that impact the quality and performance of the decoding process.

In some embodiments, the alignment tool 114 can perform different portions of the alignment procedure in parallel using multiple threads of a processing unit, such as a graphics processing unit (GPU). For example, in one embodiment, when evaluating the different combinations of alignment parameters for a given horizontal region of pixels with respect to the reference region of pixels, the alignment tool 114 can perform the evaluation of each combination of alignment parameters in parallel using an independent thread of the processing unit. Additionally, or alternatively, in one embodiment, the alignment tool 114 can perform alignment of the horizontal regions on the first side of the reference region and alignment of the horizontal regions on the second side of the reference region in parallel (e.g., independently) using different threads of the processing unit. Additionally, or alternatively, in one embodiment, in scenarios where multiple barcodes are identified (e.g., on a given package), the alignment tool 114 can perform alignment of the multiple barcodes in parallel using multiple threads of the processing unit. By performing the alignment procedure in parallel in this manner, embodiments can significantly reduce the amount of time associated with correcting tilt and/or skew in barcode images.

Figure 2:
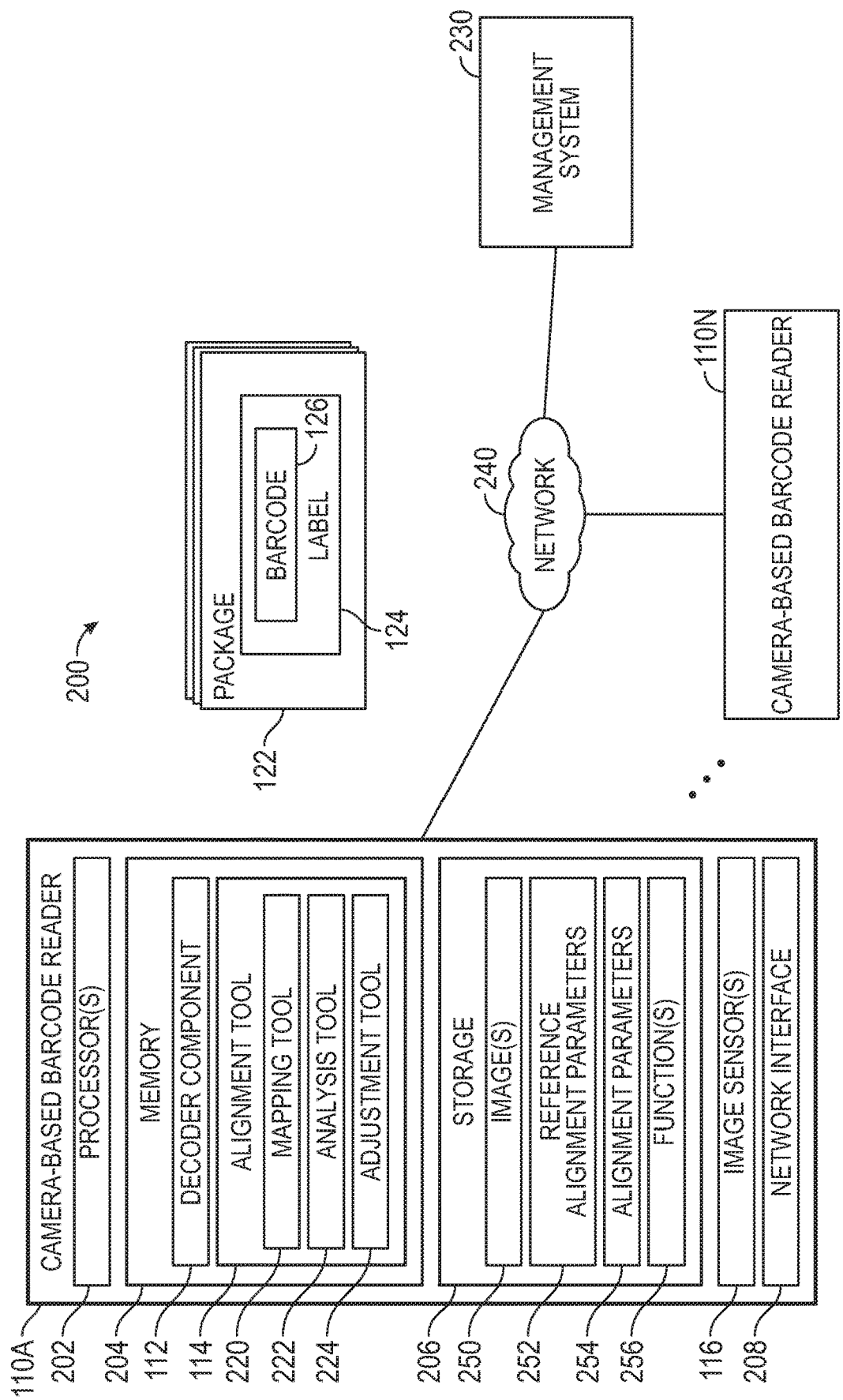
FIG. 2 is a block diagram of an example computer vision system that performs alignment of barcode images captured with one or more camera-based barcode readers, according to one embodiment.

FIG. 2 is a block diagram of an example computer vision system 200 that performs alignment of barcode images captured with one or more camera-based barcode readers, according to one embodiment. The computer vision system 200 includes camera-based barcode readers 110 A-N and a management system 230, which are interconnected via the network 240. The camera-based barcode readers 110 A-N are representative of a variety of computing devices (or systems), including a mobile computer (e.g., tablet or smartphone), a fixed-mount barcode reader device, a handheld barcode reader device, a laptop computer, a camera device, etc. The network 240, in general, may be a wide area network (WAN), a local area network (LAN), a wireless LAN, a personal area network (PAN), a cellular network, etc.

Each camera-based barcode reader 110 A-N includes a processor(s) 202, a memory 204, storage 206, image sensor(s) 116, and a network interface 208. The processor(s) 202 represents any number of processing elements which can include any number of processing cores. In one embodiment, the processors 202 can include a central processing unit (CPU) and a GPU. As described in more detail below, in some embodiments, the multiple threads of the GPU may be used to evaluate the different combinations of alignment parameters for a given horizontal region of pixels, with respect to the reference region of pixels, in parallel, significantly reducing the amount of time associated with aligning a barcode image using the techniques described herein. In some embodiments, multiple threads of GPU may be used to evaluate the set of horizontal regions on opposite sides of the reference region in parallel, in order to reduce the amount of time associated with aligning the barcode image. In some embodiments, multiple threads of the GPU may be used to evaluate multiple barcodes in parallel.

The memory 204 can include volatile memory, non-volatile memory, and combinations thereof. The storage 206 may be a disk drive storage device. Although shown as a single unit, storage 206 may be a combination of fixed and/or removable storage devices, such as fixed disc drives, removable memory cards, or optical storage, network attached storage (NAS), or a storage area-network (SAN). In one embodiment, the computing elements (or components) shown in each camera-based barcode reader 110 A-N may correspond to a physical computing system or may correspond to one or more virtual computing instances executing within a computing cloud. Here, the storage 206 includes one or more images 250, reference alignment parameters 252, (target) alignment parameters 254, and function(s) 256, described in more detail below.

The image sensor(s) 116 enable the camera-based barcode reader 110 to capture images (e.g., images 150) of barcodes 126. The image sensor(s) 116 is representative of a variety of types of electronic image sensors, including charge-coupled devices (CCDs) and active-pixel sensors, such as complementary metal-oxide semiconductor (CMOS) sensors. The network interface 208 may be any type of network communications interface (e.g., Ethernet, serial, wireless, etc.) that allows the camera-based barcode reader 110 to communicate with other computers and/or components in the computer vision system 200 via a data communications network (e.g., network 240).

As shown, the memory 204 includes the decoder component 112 and the alignment tool 114, each of which may be a software application executing on the camera-based barcode reader 110. In one embodiment, the alignment tool 114 performs an alignment process (e.g., corrects alignment) for an image 250 of a barcode 126 captured via the image sensor(s) 116). For example, the image sensor(s) 116 can capture image(s) 250 of a label 124, a portion of which may include a barcode 126. The alignment tool 114 includes a mapping tool 220, an analysis tool 222, and an adjustment tool 224, each of which may be a software application executing on the camera-based barcode reader 110.

The mapping tool 220 can determine a ROI of a barcode 126 within an image 250, and extract the barcode 126 for alignment processing. The mapping tool 220 can use a localization tool (or application) (not shown) to define the ROI on the image 250. The ROI defined on the image 250 may be a quadrilateral that approximates the location and orientation of the barcode 126 within the image 250. As described below, in one embodiment, the mapping tool 220 can map the ROI quadrilateral into a rectangular image using a projective transform.

The analysis tool 222 can evaluate the rectangular image from the mapping tool 220 and determine a set of alignment parameters 254 to apply to different horizontal regions of pixels within the rectangular image in order to align each horizontal region with a reference region within the rectangular image. As described below, in one embodiment, the analysis tool 222 can use one or more reference alignment parameters 252 and one or more functions 256 to determine the set of alignment parameters 254. The reference alignment parameters 252 can include a reference set of offset values and/or a reference set of scale values. The alignment parameters 254 for each horizontal region of the rectangular image may be determined from the reference alignment parameters 252. For example, each set of alignment parameters 254 for a given horizontal region of the rectangular may include at least one of an offset value from the reference alignment parameters 252 and a scale value from the reference alignment parameters 252. The adjustment tool 224 can adjust each of the horizontal regions within the rectangular image using the set of alignment parameters 254 determined by the analysis tool 222 for that horizontal region.

Once aligned, the alignment tool 114 sends the aligned image to the decoder component 112, which decodes the barcode from the aligned image to extract barcode data. The decoder component 112 may transmit the decoded barcode data to another computing system (e.g., management system 230) for further processing. In one embodiment, for example, the management system 230 can use the barcode data to identify a package 122 associated with the barcode 126, determine a destination (e.g., shipping destination, facility area location, etc.) of the package 122 associated with the barcode 126, etc.

Note that, in some cases, a given package 122 may include a label 124 with a barcode 126. In some cases, the barcode 126 may be located on a package 122, e.g., without a label 124. In yet other cases, the barcode 126 may be located on a label 124 without a package 122. The barcode 126 can be a linear (or 1D) barcode, examples of which include, but are not limited to, Code 128, UPC-A, EAN-13, UPC-E, Code 39, etc.

Figure 3:
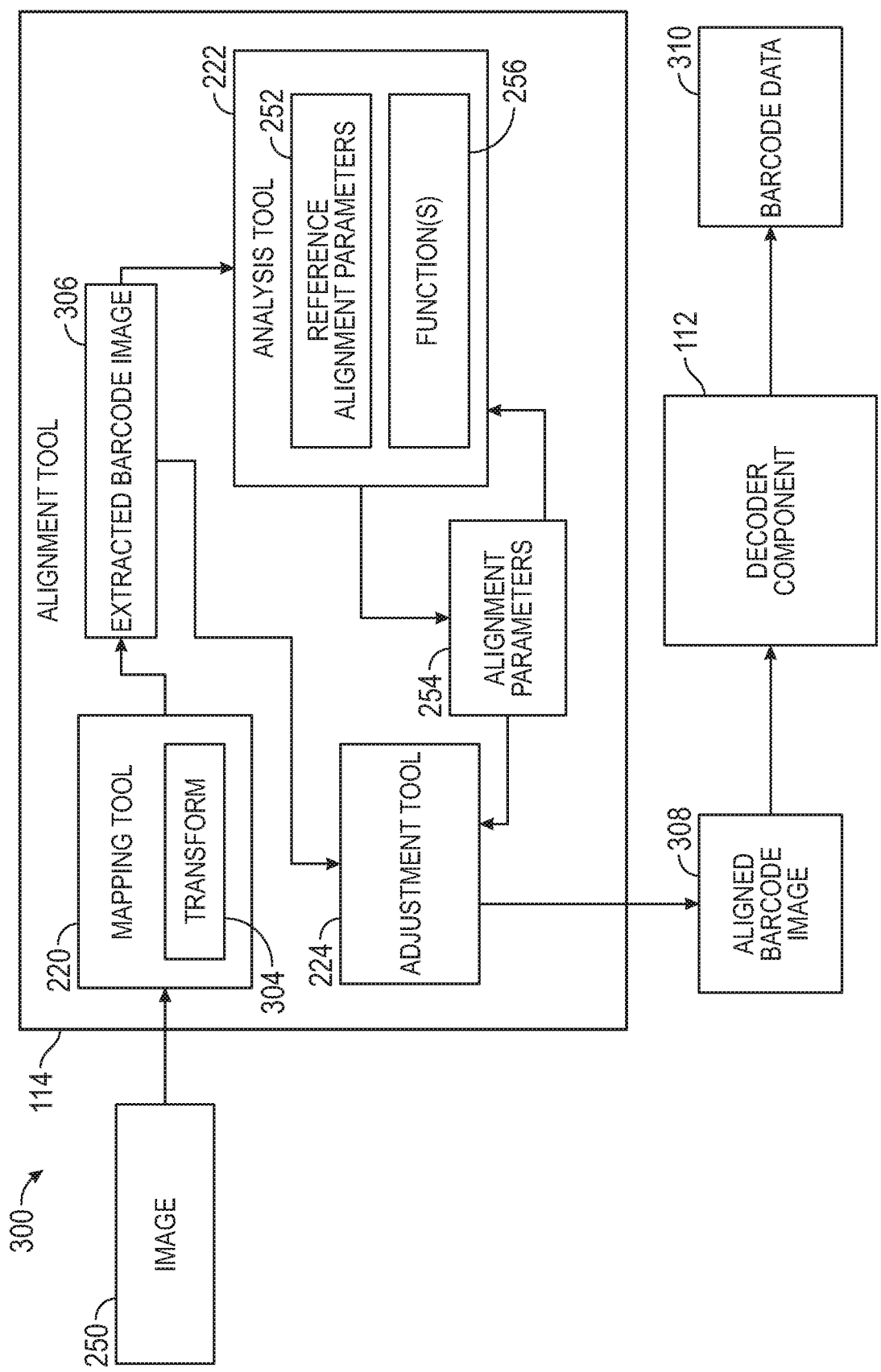
FIG. 3 is a block diagram of an example workflow for performing alignment of a barcode image captured with a camera-based barcode reader, according to one embodiment.

FIG. 3 is a block diagram of an example workflow 300 for performing alignment of a barcode image captured with a camera-based barcode reader 110, according to one embodiment. As shown, the mapping tool 220 receives an image 250 captured via the image sensor(s) 116 of the camera-based barcode reader 110. The image 250, for example, may be an image of a label 124, which may include a barcode 126. The mapping tool 220 can determine a ROI of the barcode 126 within the image 250. For example, the mapping tool 220 can use a localization tool to compute the ROI and mark the ROI in the image 250. In one embodiment, the mapping tool 220 can mark the ROI as a quadrilateral within the image 250. As noted, the ROI quadrilateral may be misaligned with the rectangular shape of the barcode 126 in the image 250.

Given the ROI defined within the image 250, the mapping tool 220 can apply a transformation to the image 250 (e.g., using projective transform 304) to obtain an extracted barcode image 306. In particular, the mapping tool 220 can obtain the extracted barcode image 306 by mapping the ROI quadrilateral into a rectangular image using the projective transform 304, interpolating between source pixels. This transformation process re-orients the barcode 126, such that in the extracted barcode image 306, the barcode 126 runs approximately horizontally across the image 306. In one embodiment, the mapping tool 220 can map the ROI quadrilateral to a rectangle with dimensions large enough to satisfy a given predetermined amount of pixels (e.g., four pixels, five pixels, etc.) per (vertical) bar in the barcode 126. Mapping the ROI quadrilateral to a rectangle in this manner enables the alignment tool 114 to align at a sub-pixel level in the original image 250. This, in turn, can substantially reduce discretization error, which is the error that results when a pixel captures some black and some white on the edge of a bar, resulting in an apparent blur.

The analysis tool 222 receives the extracted barcode image 306 and uses reference alignment parameters 252 and function(s) 256 to determine a set of alignment parameters 254 for each (target) horizontal region in the extracted barcode image 306. In one embodiment, the reference alignment parameters 252 include a set of offset values, where each offset value is used for adjusting a position of a given horizontal region in the extracted barcode image 306 in the x direction relative to a position of the reference region in the extracted barcode image 306, and a set of scale values, where each scale value is used for adjusting a size of the given horizontal region in the extracted barcode image 306 in the x direction relative to a size of the reference region. The function(s) 256 can include linear function(s) and/or non-linear function(s) for determining a measure of similarity (or an amount of difference) between a given horizontal region in the extracted barcode image 306 and the reference region in the extracted barcode image 306. Examples of function(s) 256 can include, but are not limited to, sum of squared error (SSE), absolute error function, sliding window algorithm, etc.

In one embodiment, the analysis tool 222 can choose a reference region in the extracted barcode image 306, evaluate each horizontal region in a set of (first) horizontal regions above the reference region with the set of reference alignment parameters 252 and function(s) 256, and evaluate each horizontal region in a set of (second) horizontal regions below the reference region with the set of reference alignment parameters 252 and function(s) 256. During the evaluation of each horizontal region, the analysis tool 222 can determine a set of alignment parameters 254 (that when applied to the horizontal region) results in a comparison between pixel(s) in the horizontal region and pixel(s) in the reference region that satisfies a predetermined condition (e.g., minimizes the amount of difference between the pixel(s) in the horizontal region and pixel(s) in the reference region, maximizes the amount of similarity between the pixel(s) in the horizontal region and pixel(s) in the reference region, etc.).

In some embodiments, the analysis tool 222 can perform the evaluation for each horizontal region in parallel using independent threads of a processing unit, such as a GPU. For example, the analysis tool 222 can evaluate each different combination of reference alignment parameters 252 for a given horizontal region (with respect to the reference region) in parallel using a different thread of the processing unit. When performing the evaluation in parallel, the different threads may sync and compare error values. For example, during the synchronization, the different threads can exchange error values and agree on the set of alignment parameters (that when applied to the horizontal region) results in a comparison between pixel(s) in the horizontal region and pixel(s) in the reference region that satisfies a predetermined condition, before continuing to the next horizontal region.

In some cases, the analysis tool 222 can determine how aligned two given horizontal regions are by computing the error between their corresponding pixels (e.g., computing the total distance between each pixel). In general, the error can be computed any type of error function, such as summed squared error function. In some embodiments, the analysis tool 222 can choose the reference region based on the location where the amount of difference between two adjacent horizontal regions satisfies a predetermined condition (e.g., is below a threshold amount of difference). For example, while the difference (in terms of pixels) between the top and bottom of a given barcode may be large (e.g., above a threshold), the difference between any two adjacent horizontal regions should be significantly smaller. In one particular embodiment, the analysis tool 222 can choose a horizontal region of pixels centered vertically within the extracted barcode image 306 as the reference region.

Once a set of alignment parameters 254 is determined for a given horizontal region, the adjustment tool 224 can adjust the horizontal region using the set of alignment parameters 254 to align the horizontal region with the reference region. This process (e.g., by the analysis tool 222 and the adjustment tool 224) is performed for each horizontal region in the extracted barcode image 306, until each horizontal region is aligned with the reference region in the extracted barcode image 306, resulting in an aligned barcode image 308. The aligned barcode image 308 is sent to the decoder component 112, which decodes the barcode 126 in the aligned barcode image 308 to obtain barcode data 310. In some cases, the decoder component 112 can perform a summing operation on the aligned barcode image 308. For example, the decoder component 112 can sum the different aligned horizontal regions of the barcode.

By using the techniques described herein to align a barcode image horizontally, embodiments can allow for summing of the different horizontal regions to reduce random noise and discretization error. This, in turn, enables camera-based barcode readers to successfully decode images with a high amount of noise and blurriness, relative to conventional camera-based barcode readers.

Note that FIG. 3 depicts a reference example of a configuration of the alignment tool 114 and that other configurations of the alignment tool 114 can be used to perform alignment of a barcode image. For example, while the mapping tool 220, the analysis tool 222, and the adjustment tool 224 are depicted as separate components, in some embodiments, the mapping tool 220, the analysis tool 222, and/or the adjustment tool 224 can be combined with another component to form a single component.

Figure 4:
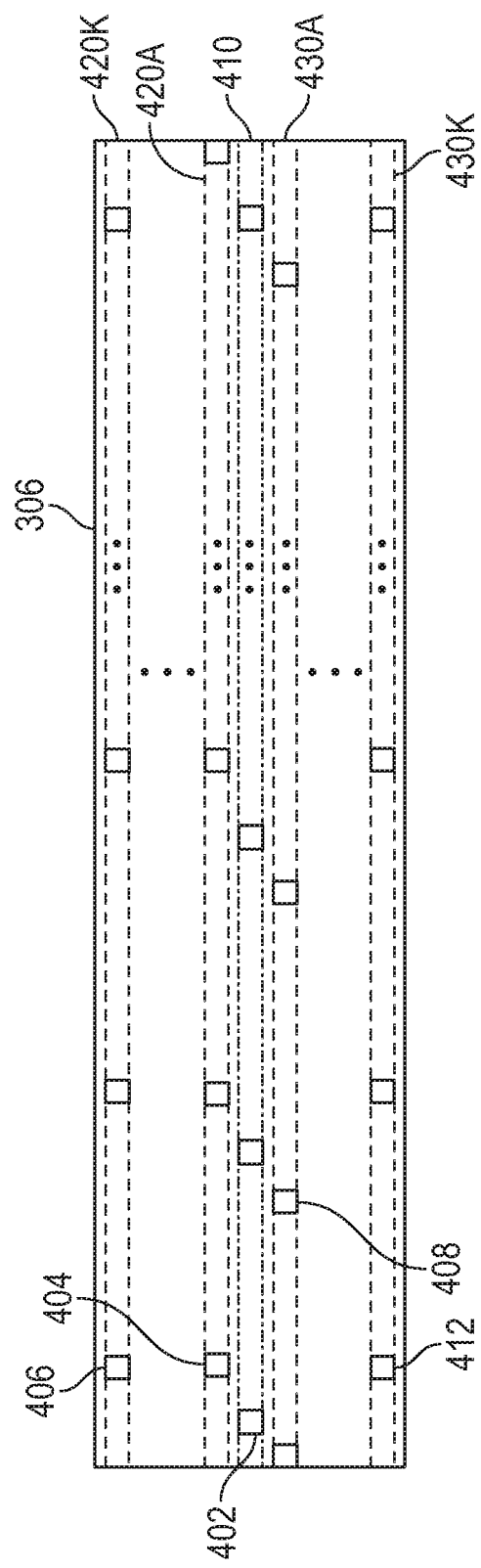
FIG. 4 illustrates an example extracted barcode image with a reference region and two sets of regions, according to one embodiment.

FIG. 4 illustrates an example extracted barcode image 306 with a reference region 410, a set of horizontal regions 420 A-K, and a set of horizontal regions 430 A-K, according to one embodiment. Here, the extracted barcode image 306 has been mapped to a rectangular image by the alignment tool 114 using a projective transform 304. As a result of this mapping, the extracted barcode image 306 may be misaligned, causing the vertical bars within the barcode to be tilted and/or skewed. Here, for example, the pixels 406, 404, 402, 408, and 412 of a given vertical bar (not shown) (e.g., extending vertically across the horizontal regions 420 and 430 within the extracted barcode image 306) may be misaligned. As part of the alignment procedure, the alignment tool 114 can choose the reference region 410, which includes a set of pixels 402 and extends horizontally (e.g., in the x direction) across the extracted barcode image 306. As shown, in one embodiment, the alignment tool 114 can choose the horizontal region of pixels (or row) centered vertically within the extracted barcode image 306 as the reference region 410.

Once the reference region 410 is determined, the alignment tool 114 can identify an adjacent horizontal region 420A (relative to the reference region 410), which includes a set of pixels 404 and extends horizontally (e.g., in the x direction) across the extracted barcode image 306. The alignment tool 114 can evaluate the horizontal region 420A and determine a set of alignment parameters 254 that when applied to the horizontal region 420A, minimizes or maximizes a value function (e.g., minimizing the amount of difference between the horizontal region 420A and the reference region 410, or maximizes the amount of similarity between the horizontal region 420A and the reference region 410). Once the horizontal region 420A is adjusted according to its set of alignment parameters 254, the alignment tool 114 can identify an adjacent horizontal region 420B (above the region 420A) and align the adjacent horizontal region 420B to the reference region 410.

The alignment tool 114 can continue to perform the alignment procedure for each horizontal region 420 above the reference region 410 until it completes alignment of horizontal region 420K, which includes a set of pixels 406 and extends horizontally across the extracted barcode image 306. For example, once alignment of horizontal region 420K is completed, the alignment tool 114 can align adjacent horizontal region 430A, which includes a set of pixels 408 and extends horizontally (e.g., in the x direction) across the extracted barcode image 306. The alignment tool 114 can repeat the alignment procedure for each horizontal region 430 below the reference region 410 until it completes alignment of horizontal region 430K, which includes a set of pixels 412 and extends horizontally across the extracted barcode image 306. In some embodiments, the alignment tool 114 can perform the alignment procedure for the horizontal regions 420 and the horizontal regions 430 in parallel using independent threads of a processing unit (e.g., GPU), e.g., to significantly reduce the amount of time associated with the alignment procedure.

In one reference example, assume the alignment tool 114 is initialized with a base_scale=1, base_offset=0, five scale parameters (S1, S2, S3, S4, S5)*base_scale, and five offset parameters (O1, O2, O3, O4, O5)+base_offset. These parameters, for example, may be initialized as the reference set of alignment parameters 252. Note, however, that this is merely an example, and any number of scale parameter and/or offset parameters can be used. In addition, the reference set of alignment parameters 252 can be adapted over time based on the scale, offset combination chosen for a given horizontal region.

Further assume that reference region 410 is chosen as the reference region to align each other horizontal region 410 and 420 in the extracted barcode image 306. In this example, when evaluating a given horizontal region (e.g., horizontal region 420 or horizontal region 430), the alignment tool 114 can compute a number of control points P along the horizontal region, for each (s,o) in the Cartesian product (scale, offset). The alignment tool 114 can then compute error using the following error function in (1):

$$\text{Error} = \Sigma_{p \in P}(\text{Region}_{s,o}[p] - \text{Reference}[p])^2 \quad (1)$$

where the error function is the SSE function. Note, however, that this error function is merely an example of the type of error function that could be used, and that other error functions (e.g. linear functions, non-linear functions, etc.) could be used to determine a measure of similarity between the given region and the reference region. The number of control points P can be configurable and may depend on one or more criteria, such as the quality of the image, amount of resources available on the camera-based barcode reader 110, etc. In one embodiment, the number of control points may be approximately equal to the number of pixels within the horizontal region. In one embodiment, the number of control points may be equal to a subset of the number of pixels within the given horizontal region (e.g., the control points P can include every X number of pixels within the horizontal region).

In this particular example, the alignment tool 114 can select the Region (s,o) that minimizes the error between the given horizontal region and the reference region 410, and adjust the given horizontal region, using the Region (s,o) parameters (e.g., in order to align the given horizontal region to the reference region). After adjusting the given horizontal region, the alignment tool 114 can update the base_scale and base_offset parameters (e.g., base_scale can be set to s in Region (s,o) and base_offset can be set to o in Region (s,o) before continuing to the next horizontal region 420 or horizontal region 430 in the extracted barcode image 306. The update of the base_scale and base_offset parameters (e.g., the reference alignment parameters 252) enables the alignment tool 114 to limit the search space for the next horizontal region to the solution space for the previous horizontal region. In this manner, the alignment tool 114 can consider very large offsets and scale factors without creating an enormous search space, enabling the alignment tool 114 to complete alignment of a barcode image in real-time.

Additionally, in the above reference example, each (scale, offset) combination, and its associated error, can be computed independently by a thread. The threads may synchronize to compare error values and agree on the (scale, offset) combination that yields the minimal amount of error for a given horizontal region. The (scale, offset) combination can be copied by threads, before the threads proceed to evaluate the next horizontal region in parallel. Note, while the above uses the example of minimizing the amount of error between a given horizontal region and a reference region, in other embodiments, the alignment tool 114 can align the horizontal region and the reference region by maximizing a value function, such as maximizing an amount of negative error.

Figure 5A:
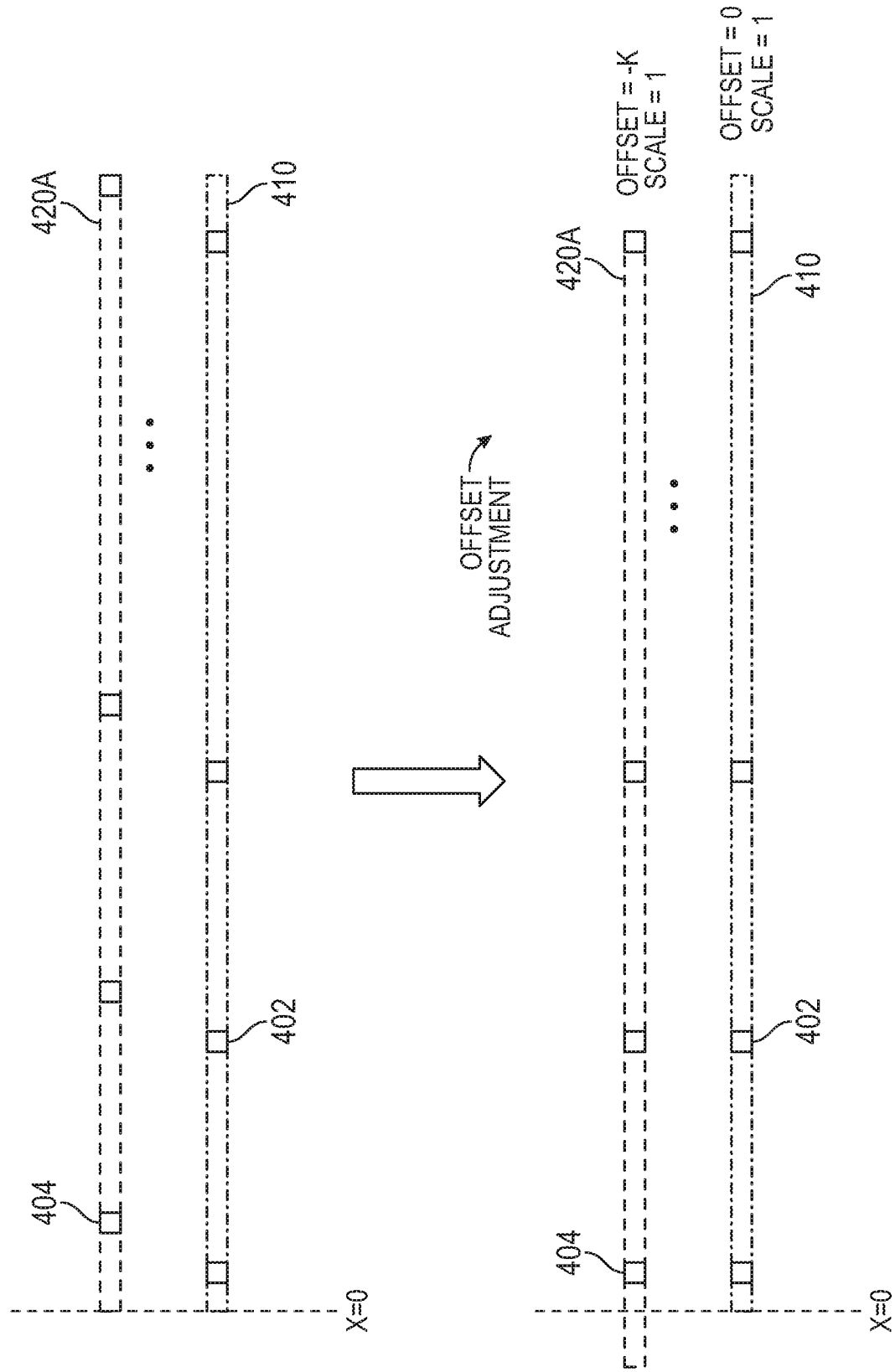
FIG. 5A illustrates an example offset adjustment for a region of pixels in a barcode image, according to one embodiment.

In one embodiment, the alignment tool 114 can adjust the given horizontal region 420 or 430 by applying an offset adjustment to the given horizontal region relative to the reference region 410. FIG. 5A, for example, shows a scenario where after an offset adjustment of "−K" (where K is a number of pixels>0) is applied to the horizontal region 420A, the pixels 404 of the horizontal region 420A are substantially aligned with the pixels 402 of the reference region 410 (e.g., an amount of difference between the pixels 404 and the pixels 402 is minimized). In particular, in FIG. 5A, the position of the horizontal region 420A is shifted in the negative x direction (relative to the position of the reference region 410) by an amount of "−K."

Figure 5B:
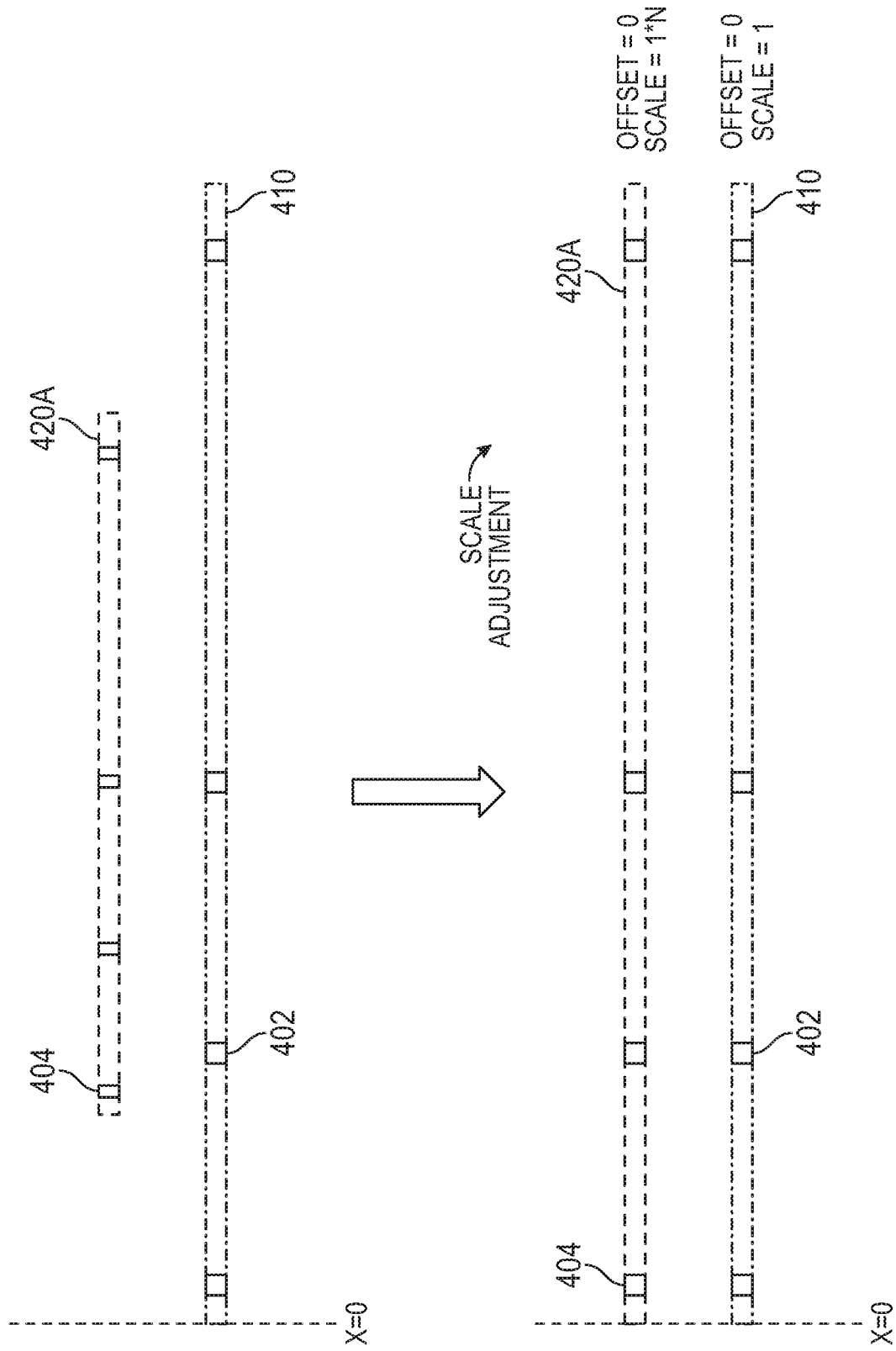
FIG. 5B illustrates an example scale adjustment for a region of pixels in a barcode image, according to one embodiment.

In another embodiment, the alignment tool 114 can adjust the given horizontal region 420 or 430 by applying a scale adjustment to the given horizontal region relative to the reference region 410. The scale adjustment, for example, can be used to stretch the horizontal region in the x direction. FIG. 5B, for example, shows a scenario where after a scale adjustment of "N" is applied (where N>0), the pixels 404 of the horizontal region 420A are substantially aligned with the pixels 402 of the reference region 410 (e.g., an amount of difference between the pixels 404 and the pixels 402 is minimized). In particular, in FIG. 5B, the size of the horizontal region 420A is increased along the x-axis (relative to the size of the reference region 410) by a factor of "N."

Figure 5C:
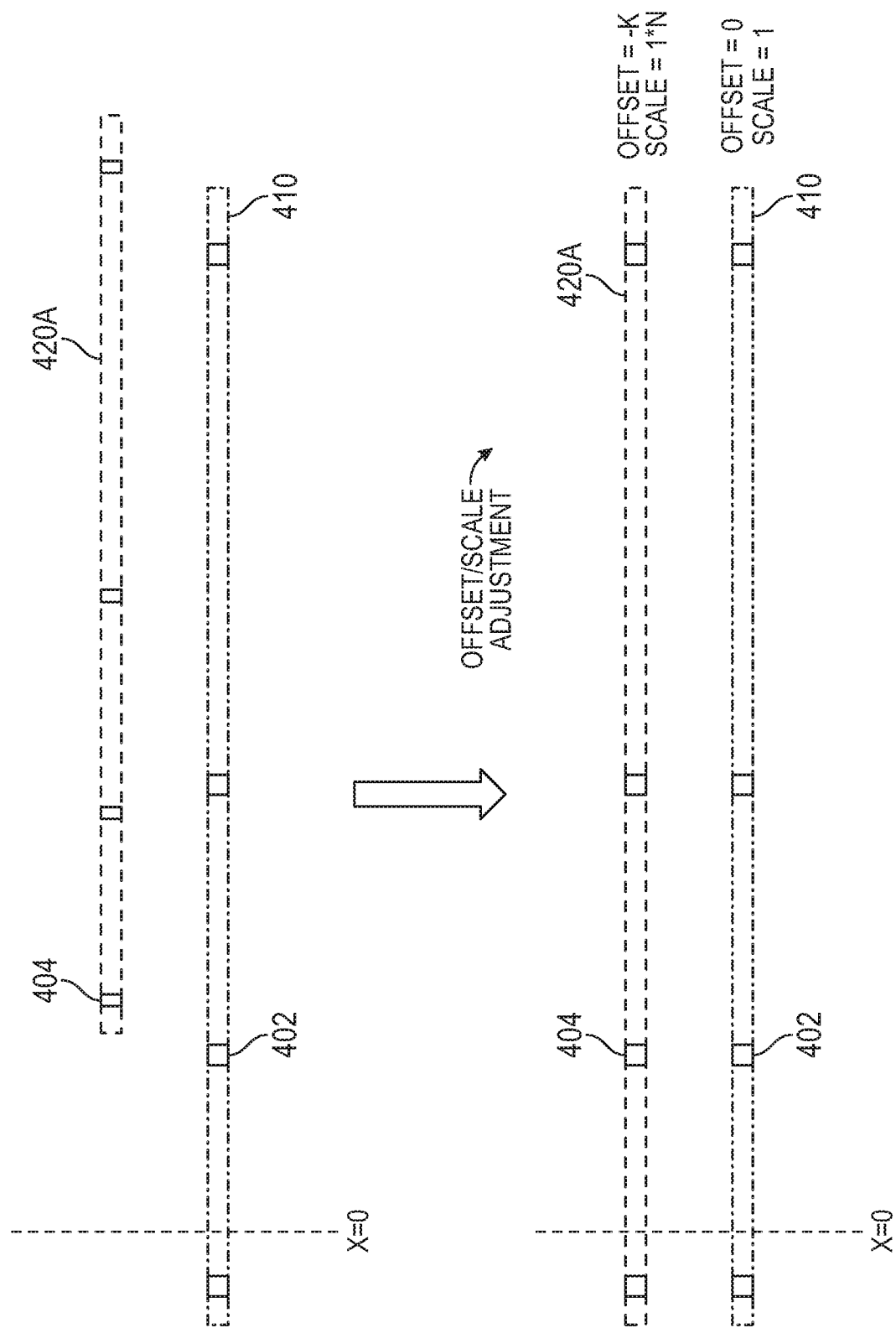
FIG. 5C illustrates an example offset and scale adjustment for a region of pixels in a barcode image, according to one embodiment.

In yet another embodiment, the alignment tool 114 can adjust the given horizontal region 420 or 430 by applying an offset adjustment and a scale adjustment to the given horizontal region relative to the reference region 410. FIG. 5C, for example, shows a scenario where after an offset adjustment of "K" and a scale adjustment of "N" are applied, the pixels 404 of the horizontal region 420A are substantially aligned with the pixels 402 of the reference region 410 (e.g., an amount of difference between the pixels 404 and the pixels 402 is minimized). Note that FIGS. 5A-5C depict reference examples of scale/offset adjustments that can be applied to a given horizontal region 420 or 430, and that other values for scale/offset adjustments can be used.

Figure 6:
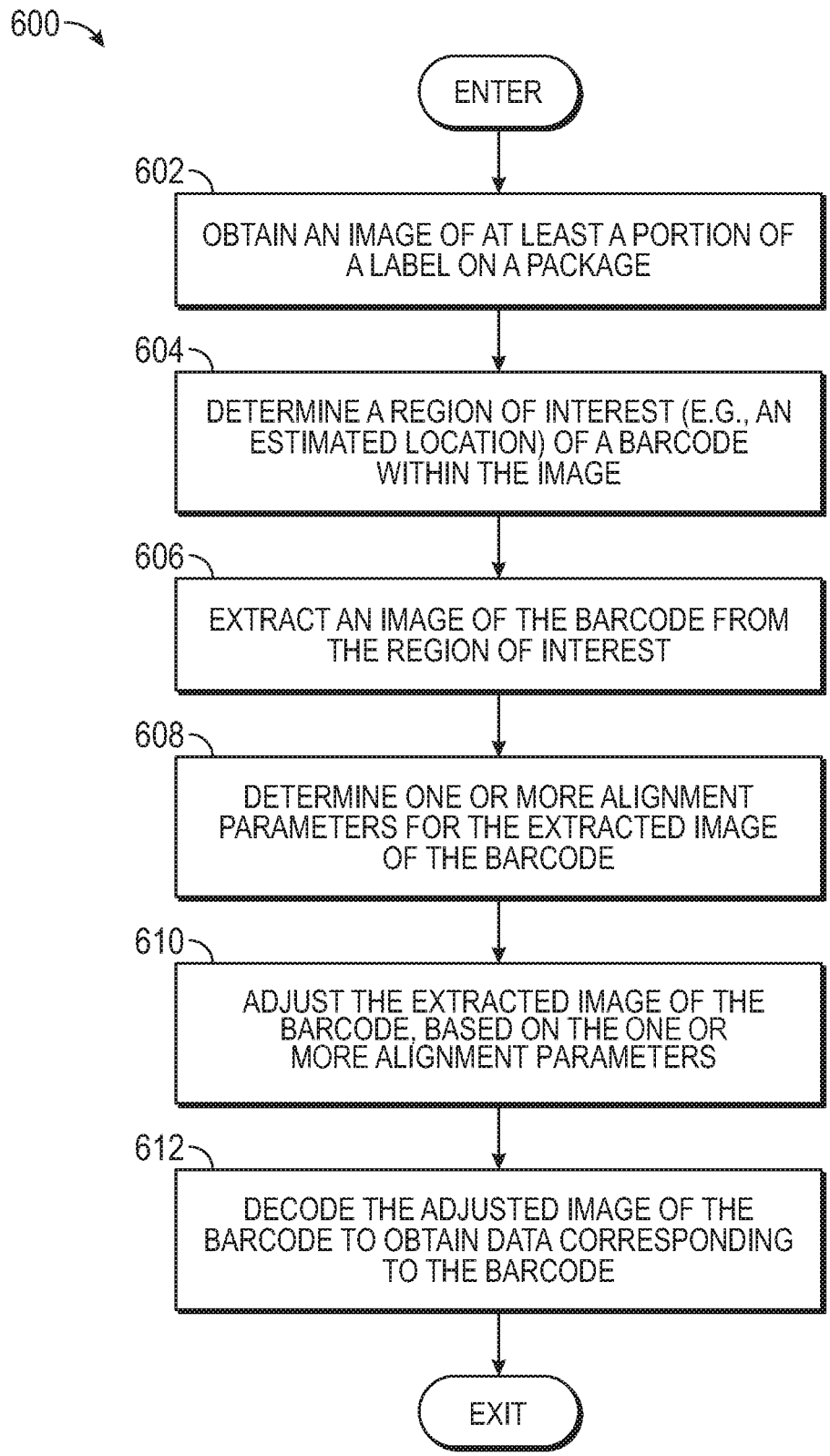
FIG. 6 is a flowchart of a method for decoding a barcode from an image of the barcode captured by a camera-based barcode reader, according to one embodiment.

FIG. 6 is a flowchart of a method 600 for decoding a barcode from an image of the barcode captured by a camera-based barcode reader 110, according to one embodiment. The method 600 may be performed by a camera-based barcode reader 110.

Figure 7A:
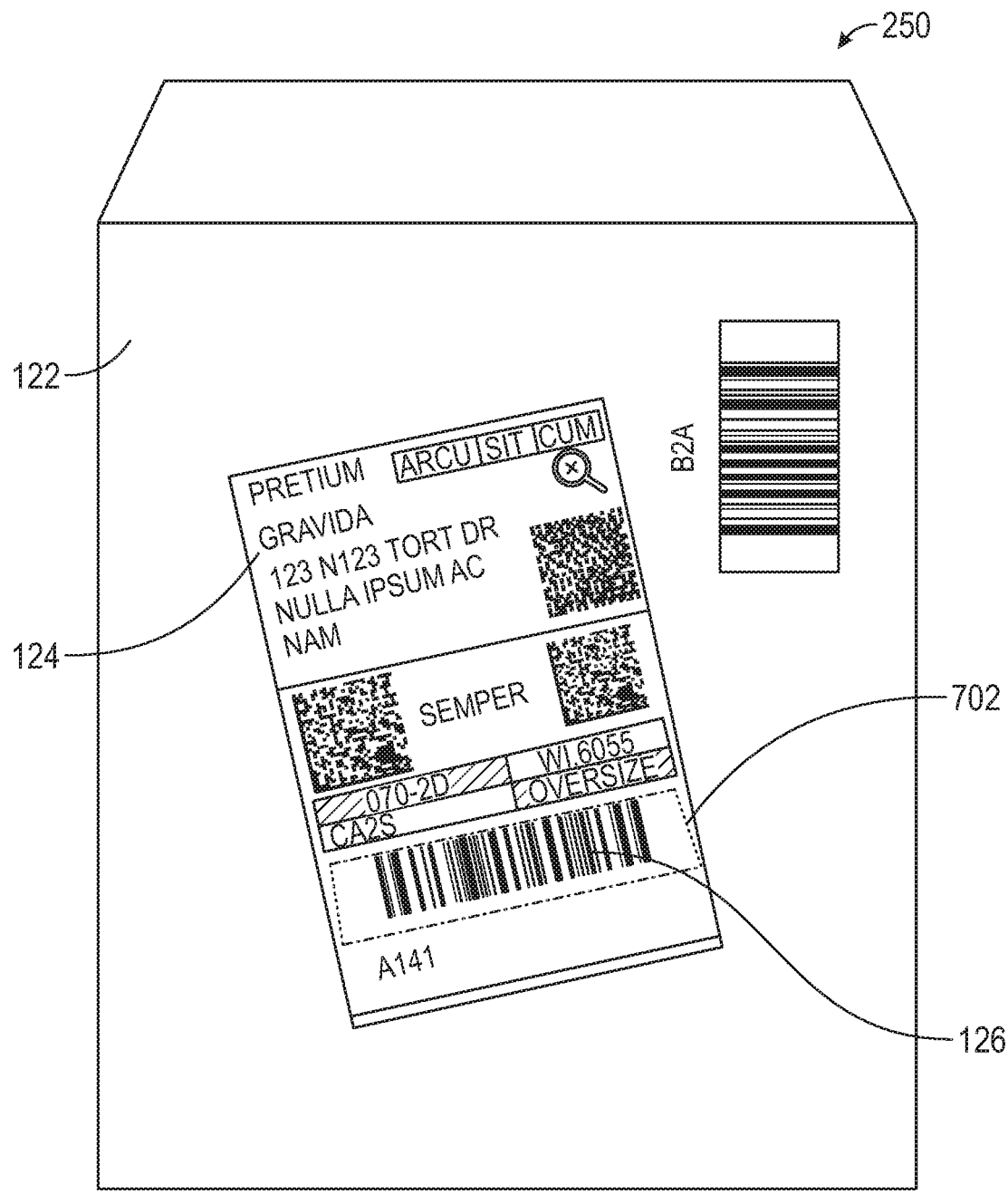
FIG. 7A illustrates an example image of a label captured with a camera-based barcode reader, according to one embodiment.

The method 600 may enter at block 602, where the camera-based barcode reader 110 obtains (e.g., using image sensor(s) 116) an image (e.g., image 250) of at least a portion of a label (e.g., label 124) on a package (e.g., package 122). FIG. 7A depicts an example of an image 250 of a label 124 that can be captured by the camera-based barcode reader 110. At block 604, the camera-based barcode reader 110 determines a ROI (e.g., an estimated location and/or orientation) of a barcode (e.g., barcode 126) within the image. As shown in FIG. 7A, for example, the camera-based barcode reader 110 can determine a ROI quadrilateral 702 that defines the estimated location and orientation of the barcode 126. In the particular example depicted in FIG. 7A, the ROI quadrilateral 702 is misaligned with respect to the rectangular barcode 126.

Figure 7B:
FIG. 7B illustrates an example image of a barcode extracted from an image of a label with a camera-based barcode reader, according to one embodiment.

At block 606, the camera-based barcode reader 110 extracts an image of the barcode (e.g., extracted barcode image 306) from the ROI. FIG. 7B illustrates an example of an extracted barcode image 306 from a ROI quadrilateral (e.g., ROI quadrilateral 702). As noted, the extracted barcode image 306 can be obtained by mapping the ROI quadrilateral 702 to a rectangular image using a projective transform 304.

Figure 7C:
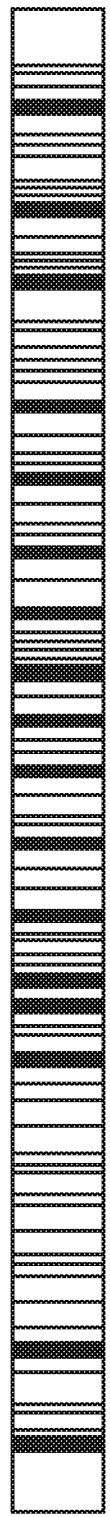
FIG. 7C illustrates an example image of a barcode after undergoing an alignment procedure, according to one embodiment.

At block 608, the camera-based barcode reader 110 determines one or more alignment parameters (e.g., alignment parameters 254) for the extracted image of the barcode. At block 610, the camera-based barcode reader 110 adjusts the extracted image of the barcode, based on the alignment parameters to obtain an aligned barcode image (e.g., aligned barcode image 308). FIG. 7C depicts an example aligned barcode image 308 that can be obtained after adjusting the extracted barcode image according to alignment parameters 254. At block 612, the camera-based barcode reader 110 decodes the adjusted image of the barcode to obtain data (e.g., barcode data 310) corresponding to the barcode.

Figure 8:
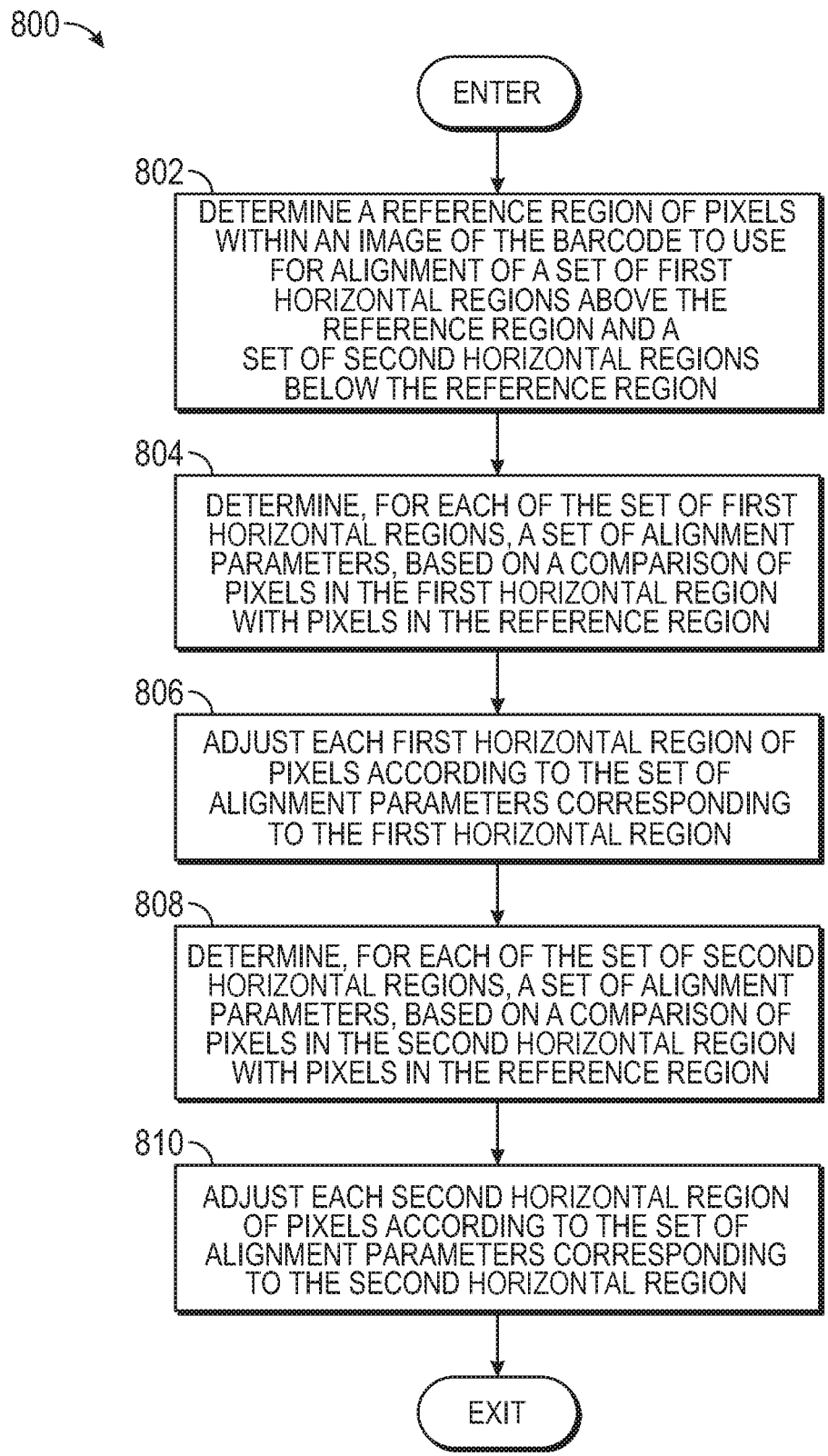
FIG. 8 is a flowchart of a method for performing alignment of a barcode image captured with a camera-based barcode reader, according to one embodiment.

FIG. 8 is a flowchart of a method 800 for performing alignment of a barcode image captured with a camera-based barcode reader 110, according to one embodiment. The method 800 may be performed by one or more components of an alignment tool (e.g., alignment tool 114).

The method 800 may enter at block 802, where the alignment tool determines a reference region of pixels (e.g., reference region 410) within an image of the barcode (e.g., extracted barcode image 306) to use for alignment of a set of first horizontal regions (e.g., horizontal regions 420) above the reference region and a set of second horizontal regions (e.g., horizontal regions 430) below the reference region. At block 804, the alignment tool determines, for each of the set of first horizontal regions, a set of alignment parameters (e.g., alignment parameters 254), based on a comparison of pixels in the first horizontal region (adjusted according to different combinations of alignment parameters) with pixels in the reference region. At block 806, the alignment tool adjusts each first horizontal region of pixels according to the set of alignment parameters corresponding to the first horizontal region.

At block 808, the alignment tool determines, for each of the set of second horizontal regions, a set of alignment parameters (e.g., alignment parameters 254), based on a comparison of pixels in the second horizontal region (adjusted according to different combinations of alignment parameters) with pixels in the reference region. At block 810, the alignment tool adjusts each second horizontal region of pixels according to the set of alignment parameters corresponding to the second horizontal region.

Figure 9:
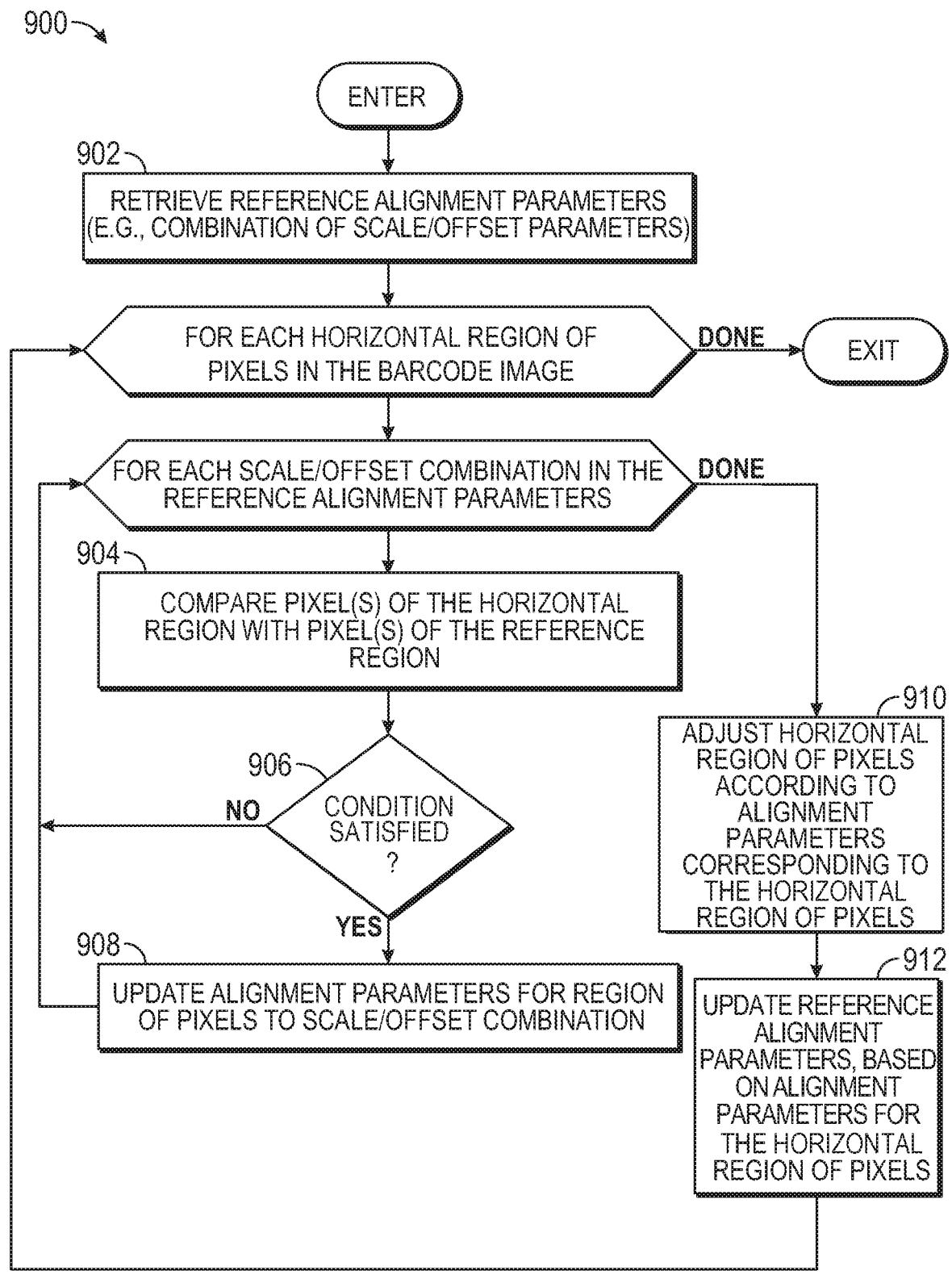
FIG. 9 is a flowchart of a method for determining and applying adjustment parameters for regions of a barcode image captured with a camera-based barcode reader, according to one embodiment.

FIG. 9 is a flowchart of a method 900 for determining and applying adjustment parameters for regions of a barcode image captured with a camera-based barcode reader 110, according to one embodiment. The method 900 may be performed by one or more components of an alignment tool (e.g., alignment tool 114).

The method 900 may enter at block 902, where the alignment tool retrieves reference alignment parameters (e.g., reference alignment parameters 252, which may include different combinations of scale/offset parameters). The alignment tool may then evaluate each horizontal region of pixels in the barcode image, e.g., by performing blocks 904, 906, and 908 for each scale/offset combination in the reference alignment parameters. At block 904, for example, the alignment tool compares pixel(s) of the horizontal region with pixel(s) of the reference region, for a given scale/offset combination. In one embodiment, the comparison may involve minimizing a value function. For example, at block 904, the alignment tool can determine an amount of difference between pixel(s) of the horizontal region with pixel(s) of the reference region, for a given scale/offset combination. In another embodiment, the comparison may involve maximizing a value function. For example, at block 904, the alignment tool can determine an amount of similarity (e.g., an amount of negative error) between pixel(s) of the horizontal region with pixel(s) of the reference region, for a given scale/offset combination.

At block 906, the alignment tool determines whether the comparison of pixel(s) of the horizontal region with pixel(s) of the reference region (using the given scale/offset combination) satisfies a predetermined condition. In one embodiment, the predetermination condition may be the lowest amount of difference or the largest amount of similarity that has been obtained for the particular horizontal region of pixels being currently evaluated. If the condition for the particular horizontal region of pixels being evaluated is satisfied, then the alignment tool updates the alignment parameters (e.g., alignment parameters 254) for the horizontal region of pixels to the scale/offset combination (block 908). On the other hand, if the condition for the particular horizontal region of pixels being evaluated is not satisfied, then the alignment tool proceeds to evaluate the particular horizontal region of pixels using another scale/offset combination in the reference alignment parameters (e.g., proceeds to perform at least blocks 904 and 906 for another scale/offset combination).

In some embodiments, the alignment tool can perform block 904 for each scale/offset combination in parallel using an independent thread of a processing unit (e.g., GPU). In this embodiment, the threads may synchronize to perform blocks 906 and 908 (e.g., comparing error values to determine the scale/offset combination that yields the lowest amount of difference) prior to proceeding to the next horizontal region of pixels.

Once each scale/offset combination has been evaluated for a given horizontal region of pixels, the alignment tool adjusts the horizontal region of pixels according to the alignment parameters corresponding to the horizontal region of pixels (block 910). The alignment tool can also update the reference alignment parameters, based on the alignment parameters for the horizontal region of pixels (block 912). For example, when the alignment tool proceeds to evaluate another horizontal region of pixels, the alignment tool can use the alignment parameters determined for the previous horizontal region of pixels as a starting point for the (next) horizontal region of pixels. Doing so enables the alignment tool to dynamically adapt the alignment parameters based on the alignment of a given barcode image.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A camera-based barcode reader, comprising:
   one or more image sensors;
   at least one processor; and
   a memory storing one or more applications, which, when executed by the at least one processor performs an operation comprising:
   capturing, via the one or more image sensors, an image of at least a portion of a label on a package;
   determining a region of interest of a one-dimensional (1D) barcode within the image captured via the one or more image sensors, wherein the region of interest defines an estimated location and orientation of the 1D barcode within the image captured via the one or more image sensors and wherein the region of interest is misaligned relative to the 1D barcode within the image captured via the one or more image sensors;
   extracting a barcode image from the region of interest;
   performing an alignment of the barcode image, comprising:
      determining a reference region of pixels within the barcode image, a first region of pixels within the barcode image, and a second region of pixels within the barcode image, wherein each of the reference region of pixels, the first region of pixels, and the second region of pixels extends horizontally across the barcode image;
      determining a first set of alignment parameters to apply to the first region of pixels, based on a comparison of pixels in the reference region to pixels in the first region;
      adjusting the first region of pixels based on the first set of alignment parameters;
      determining a second set of alignment parameters to apply to the second region of pixels, based on a comparison of pixels in the reference region to pixels in the second region; and
      adjusting the second region of pixels based on the second set of alignment parameters; and
   after performing the alignment of the barcode image, decoding the barcode image to obtain data corresponding to the 1D barcode.

2. The camera-based barcode reader of claim 1, wherein:
   the first region of pixels and the second region of pixels are each adjacent to the reference region of pixels;
   the first region of pixels is located above the reference region of pixels; and
   the second region of pixels is located below the reference region of pixels.

3. The camera-based barcode reader of claim 1, wherein the second set of alignment parameters to apply to the second region of pixels is determined after the first region of pixels is adjusted based on the first set of alignment parameters.

4. The camera-based barcode reader of claim 1, wherein the first set of alignment parameters and the second set of alignment parameters each comprise at least one of an offset adjustment and a scale adjustment.

5. The camera-based barcode reader of claim 1, wherein extracting the barcode image comprises generating a rectangular image of the barcode from the region of interest.

6. A computer-implemented method, comprising:
   determining a region of interest of a barcode within an image captured with a barcode reader;
   generating a barcode image from the region of interest;
   aligning each of a plurality of horizontal regions of pixels within the barcode image to a reference horizontal region of pixels within the barcode image, comprising, for at least a first of the plurality of horizontal regions:
      determining a set of alignment parameters to apply to the first horizontal region, based on a comparison of the reference horizontal region to the first horizontal region adjusted according to different combinations of first and second alignment parameters; and
      adjusting the first horizontal region according to the set of alignment parameters determined for the first horizontal region; and
   after aligning each of the plurality of horizontal regions of pixels within the barcode image, decoding the barcode from the barcode image.

7. The computer-implemented method of claim 6, wherein determining the set of alignment parameters to apply to the first horizontal region further comprises:
   for each combination of the first and second alignment parameters, comparing (i) one or more pixels within the reference horizontal region with (ii) one or more pixels within the first horizontal region when adjusted according to the combination of the first and second alignment parameters; and
   selecting as the set of alignment parameters for the first horizontal region the combination of the first and second alignment parameters that results in a comparison that satisfies a predetermined condition.

8. The computer-implemented method of claim 7, wherein:
   the comparing comprises determining an amount of difference between (i) one or more pixels within the reference horizontal region and (ii) one or more pixels within the first horizontal region when adjusted according to the combination of the first and second alignment parameters; and
   the predetermined condition comprises a smallest amount of difference between the one or more pixels within the reference horizontal region and the one or more pixels within the first horizontal region when adjusted according to the combination of the first and second alignment parameters.

9. The computer-implemented method of claim 7, wherein:
the comparing comprises determining an amount of similarity between (i) one or more pixels within the reference horizontal region and (ii) one or more pixels within the first horizontal region when adjusted according to the combination of the first and second alignment parameters; and
the predetermined condition comprises a largest amount of similarity between the one or more pixels within the reference horizontal region and the one or more pixels within the first horizontal region when adjusted according to the combination of the first and second alignment parameters.

10. The computer-implemented method of claim 7, wherein determining the set of alignment parameters to apply to the first horizontal region further comprises evaluating each combination of the first and second alignment parameters in parallel with a different thread of a processing unit.

11. The computer-implemented method of claim 6, wherein aligning each of the plurality of horizontal regions of pixels within the barcode image to the reference horizontal region of pixels within the barcode image further comprises, for at least a second of the plurality of horizontal regions:
determining a set of alignment parameters to apply to the second horizontal region, based on a comparison of the reference horizontal region to the second horizontal region adjusted according to the different combinations of the first and second alignment parameters; and
adjusting the second horizontal region according to the set of alignment parameters determined for the second horizontal region.

12. The computer-implemented method of claim 11, wherein:
the reference horizontal region is centered vertically within the barcode image;
the first horizontal region is located above the reference horizontal region; and
the second horizontal region is located below the reference horizontal region.

13. The computer-implemented method of claim 11, wherein aligning each of the plurality of horizontal regions comprises aligning the first horizontal region and the second horizontal region in parallel with different threads of a processing unit.

14. The computer-implemented method of claim 11, wherein aligning each of the plurality of horizontal regions comprises aligning the first horizontal region prior to aligning the second horizontal region.

15. The computer-implemented method of claim 14, wherein:
aligning the first horizontal region comprises updating the first and second alignment parameters based on the set of alignment parameters determined for the first horizontal region;
the first alignment parameters comprise a plurality of different offset adjustments; and
the second alignment parameters comprise a plurality of different scale adjustments.

16. The computer-implemented method of claim 6, wherein decoding the barcode comprises summing the plurality of horizontal regions of pixels.

17. A computer-readable storage medium storing instructions, which, when executed on one or more computer processors, perform an operation comprising:
determining a region of interest of a barcode within an image;
generating a barcode image from the region of interest;
aligning each of a plurality of horizontal regions of pixels within the barcode image to a reference horizontal region of pixels within the barcode image, comprising, for at least a first of the plurality of horizontal regions:
determining a set of alignment parameters to apply to the first horizontal region, based on a comparison of the reference horizontal region to the first horizontal region adjusted according to different combinations of first and second alignment parameters; and
adjusting the first horizontal region according to the set of alignment parameters determined for the first horizontal region; and
after aligning each of the plurality of horizontal regions of pixels within the barcode image, decoding the barcode from the barcode image.

18. The computer-readable storage medium of claim 17, wherein determining the set of alignment parameters to apply to the first horizontal region further comprises minimizing or maximizing a value function, based on the first and second alignment parameters.

19. The computer-readable storage medium of claim 18, wherein minimizing the value function, based on the first and second alignment parameters comprises:
for each combination of the first and second alignment parameters, determining an amount of difference between (i) one or more pixels within the reference horizontal region and (ii) one or more pixels within the first horizontal region when adjusted according to the combination of the first and second alignment parameters; and
selecting as the set of alignment parameters for the first horizontal region the combination of the first and second alignment parameters that results in a smallest amount of difference between the one or more pixels within the reference horizontal region and the one or more pixels within the first horizontal region when adjusted according to the combination of the first and second alignment parameters.

20. The computer-readable storage medium of claim 18, wherein determining the set of alignment parameters to apply to the first horizontal region further comprises evaluating each combination of the first and second alignment parameters in parallel with a different thread of a processing unit.

* * * * *